US008282875B2

(12) United States Patent
Roos et al.

(10) Patent No.: US 8,282,875 B2
(45) Date of Patent: Oct. 9, 2012

(54) PROCESS FOR MANUFACTURING A FUEL TANK EQUIPPED WITH AN INTERNAL ACCESSORY

(75) Inventors: Sylvain Roos, Gyeongju (KR); Manuel Bretnacher, Gyeongju (KR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 293 days.

(21) Appl. No.: 12/597,374

(22) PCT Filed: May 8, 2008

(86) PCT No.: PCT/EP2008/055715
§ 371 (c)(1),
(2), (4) Date: Oct. 23, 2009

(87) PCT Pub. No.: WO2008/138869
PCT Pub. Date: Nov. 20, 2008

(65) Prior Publication Data
US 2010/0126659 A1 May 27, 2010

(30) Foreign Application Priority Data
May 10, 2007 (FR) ...................................... 07 54962

(51) Int. Cl.
*B29C 49/22* (2006.01)
(52) U.S. Cl. ........ 264/516; 264/511; 264/529; 264/531; 264/259
(58) Field of Classification Search .................. None
See application file for complete search history.

(56) References Cited

U.S. PATENT DOCUMENTS

| 3,954,369 A | | 5/1976 | Kormendi | |
|---|---|---|---|---|
| 4,313,904 A | * | 2/1982 | Larkin et al. | 264/515 |
| 4,650,627 A | * | 3/1987 | Peters | 264/529 |
| 4,719,072 A | * | 1/1988 | Kojima et al. | 264/515 |
| 5,308,427 A | | 5/1994 | Duhaime | |
| 5,445,783 A | * | 8/1995 | Irish et al. | 264/515 |
| 6,138,857 A | | 10/2000 | Keller | |
| 2001/0013516 A1 | | 8/2001 | Boecker | |

FOREIGN PATENT DOCUMENTS

| DE | 10237187 A1 | 7/2003 |
|---|---|---|
| DE | 10260952 A1 | 7/2004 |
| EP | 0103832 A2 | 3/1984 |
| EP | 1006014 A2 | 6/2000 |
| FR | 2494176 A1 | 5/1982 |
| JP | 55105539 A | 8/1980 |
| JP | 56028831 A | 3/1981 |
| JP | 6143396 A | 5/1994 |

* cited by examiner

Primary Examiner — Monica A Huson
(74) Attorney, Agent, or Firm — Oblon, Spivak, McClelland, Maier & Neustadt, L.L.P.

(57) ABSTRACT

Process for manufacturing a fuel tank equipped with an internal accessory and having a plastic wall produced from a parison, said process comprising, in order, the following steps:

a) the accessory and the molten parison are introduced into a mould so that the accessory is surrounded by the parison, said mould comprising cavities equipped with at least one moving part;

b) a pressurized gas is introduced inside the parison to carry out a pre-blow moulding of said parison;

c) the pre-blow-moulded parison is pressed locally against the accessory using the moving part in order to firmly attach the two without piercing the parison;

d) the mould is closed and the final blow moulding of the parison is carried out by flattening it against the mould cavities using the pressurized gas; and e) the tank is removed from the mould.

9 Claims, 9 Drawing Sheets

Fig. 12
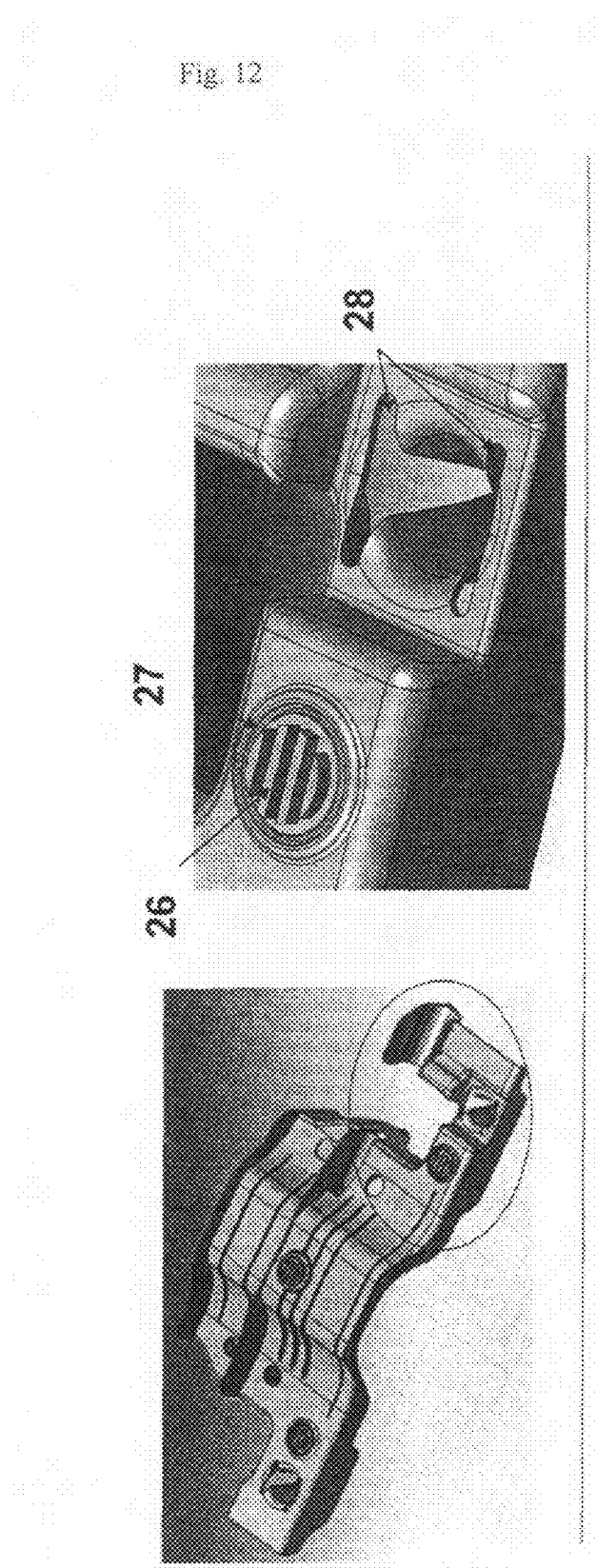
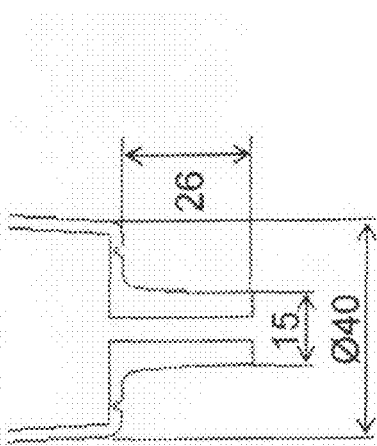
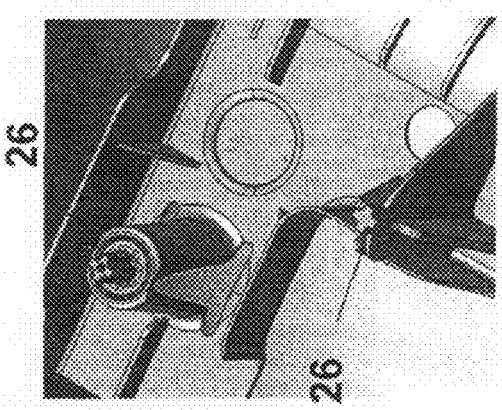
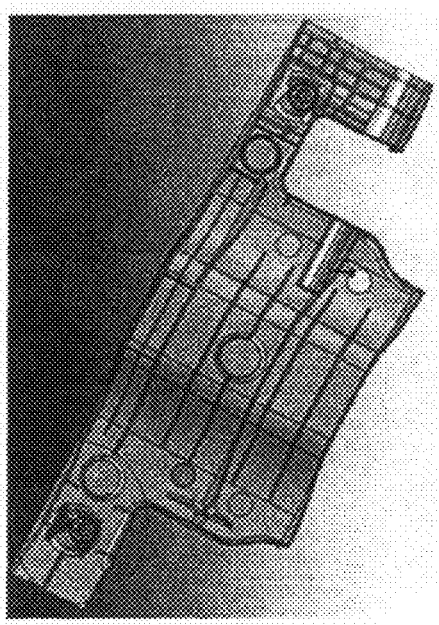

PROCESS FOR MANUFACTURING A FUEL TANK EQUIPPED WITH AN INTERNAL ACCESSORY

CROSS-REFERENCE TO RELATED APPLICATIONS

This application is a U.S. national stage application under 35 U.S.C. §371 of International Application No. PCT/EP2008/055715 filed May 8, 2008, which claims priority to French Application No. 0754962 filed May 10, 2007, these applications being incorporated herein by reference in their entirety for all purposes.

The present invention relates to a process for manufacturing a fuel tank equipped with an internal accessory and in particular a noise reduction baffle.

Fuel systems on board vehicles of various types generally comprise a tank for storing fuel, and this tank generally comprises at least one internal component. Conventionally, in the case of plastic tanks obtained by extrusion-blow moulding, such a component is introduced into and attached to the tank, after the manufacture of the latter, through an opening made in the wall of the tank. However, the penetration through the wall of the tank must take into account the sealing requirements laid down by current environmental standards (LEV II and PZEV for example). For this purpose, the reduction in the number and size of the openings in the wall of the tank constitutes a favourable factor in reducing evaporative losses.

One particular case of such accessories is that of noise reduction baffles, the purpose of which is to absorb the noise ("slosh" noise) associated with the waves which may be generated inside the tank when the vehicle accelerates rapidly, brakes, turns, etc. Such baffles are also known as anti-slosh baffles in the jargon of the field.

In order to solve the problem of attaching them to the inside of a tank without having to make an opening/cut therein, it is known to introduce them into the tank at the same time as it is manufactured by extrusion of a tubular parison around such a baffle, and then by blow moulding the parison and by attaching the baffle to this parison.

In such a process, the baffle may be attached to the parison after or before blow moulding of this parison.

One process according to the $1^{st}$ alternative is described in Application EP 103832 and comprises the following steps:
- extrusion of a tubular parison around a baffle held by a support pin;
- piercing the parison with a mandrel that is firmly attached to the mould and that takes on the role of a support;
- withdrawal of the support pin;
- blow moulding of the parison;
- attachment of the baffle to the blow-moulded parison using the mandrel;
- withdrawal of the mandrel and demoulding of the tank.

This process therefore has the disadvantage that the parison is pierced outside of the parting line and therefore has an opening which must be resealed in a leaktight manner after demoulding of the tank.

The process described in Application JP 6143396 makes it possible to solve this problem by arranging to attach the baffle to the parison by welding before blow moulding of the parison, specifically due to moving parts in the mould cavities. This process however has the disadvantage that the internal volume of the tank is limited around the baffle since this baffle is welded before blow moulding and therefore limits the expansion of the parison in its vicinity. Similarly, the size of the baffle is limited by the volume of the extruded parison (which is smaller than that of the blow-moulded tank).

BRIEF DESCRIPTION OF THE DRAWINGS

FIG. 12 is a schematic diagram illustrating a process according to an embodiment of the present application; and

DETAILED DESCRIPTION OF EMBODIMENTS

Figure 1:
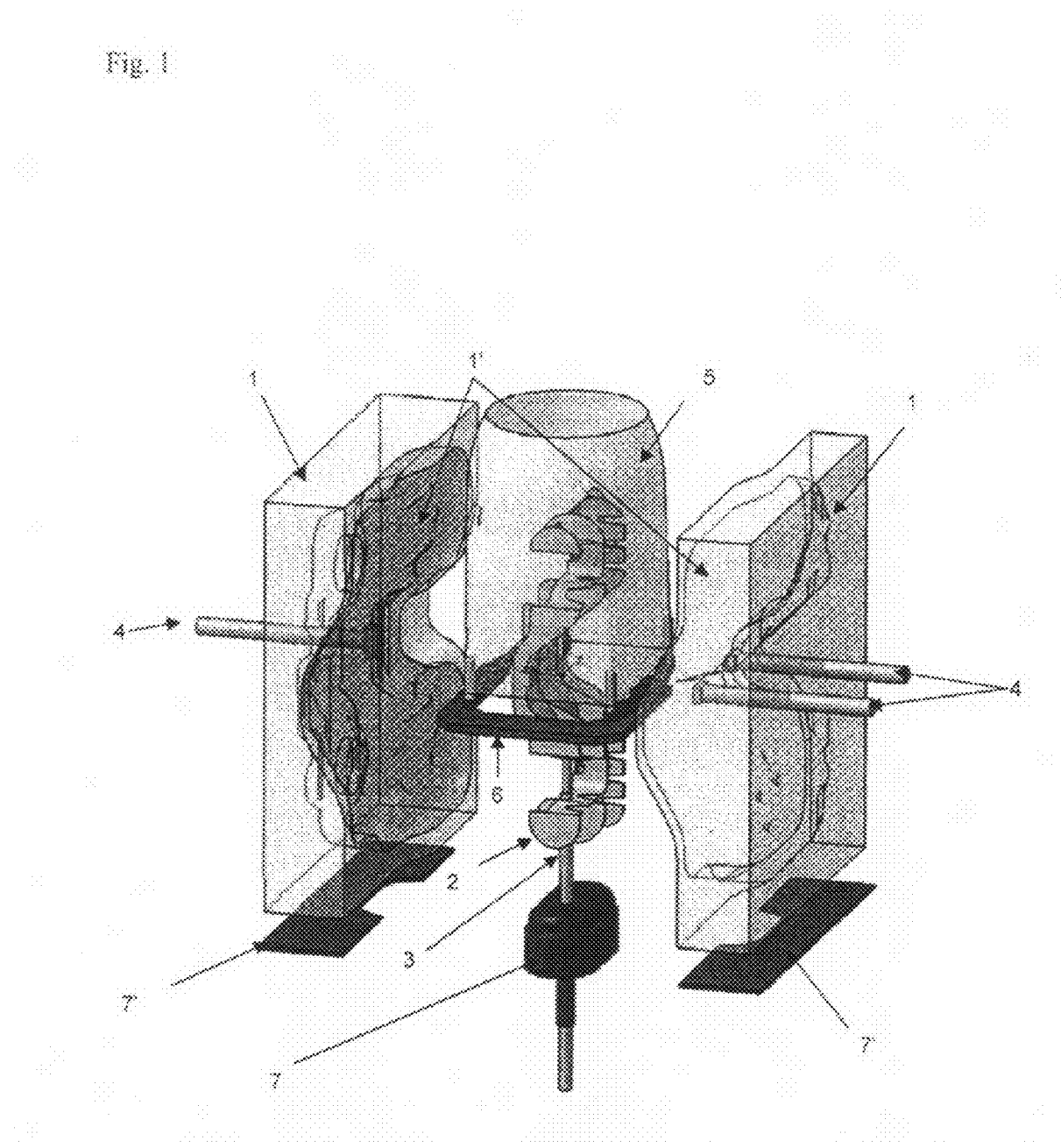
FIG. 1 is a schematic diagram illustrating a process according to an embodiment of the present application.

The present invention aims to solve these problems by providing a process in which the attachment of the baffle (or of another internal accessory) to the parison takes place without piercing/cutting of the parison, does not necessarily lead to a restriction of the tank volume around the baffle and allows the insertion of a large-sized (and therefore more effective) baffle.

For this purpose, the present invention relates to a process for manufacturing a fuel tank equipped with an internal accessory and having a plastic wall produced from a parison, said process comprising, in order, the following steps:
a) the accessory and the molten parison are introduced into a mould so that the accessory is surrounded by the parison, said mould comprising cavities equipped with at least one moving part;
b) a pressurized gas is introduced inside the parison to carry out a pre-blow moulding of said parison;
c) the pre-blow-moulded parison is pressed locally against the accessory using the moving part in order to firmly attach the two without piercing the parison;
d) the mould is closed and the final blow moulding of the parison is carried out by flattening it against the mould cavities using the pressurized gas; and
e) the tank is removed from the mould.

The term "accessory" is understood within the context of the invention to mean a component or a set of components having an active role in the tank such as to ventilate, to convey fuel to the engine, to measure the liquid level, to reduce the noise linked to waves, etc. In particular, it is a noise reduction baffle such as described previously. Preferably, this baffle is made of plastic and most particularly preferably, it is based on the same plastic as that forming the parison (and therefore the tank which is moulded from it). It is therefore, advantageously, a baffle made of high-density polyethylene (HDPE): see below.

The expression "fuel tank" is understood to mean a leakproof tank, able to store fuel under diverse and varied usage and environmental conditions. An example of this tank is that with which motor vehicles are fitted.

The fuel tank according to the invention is made with a plastic wall, generally comprising an internal face on its concave part and an external face on its convex part.

The term "plastic" is understood to mean any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used similarly it is also possible to use a blend of polymeric materials with inorganic, organic and/or natural fillers such as, for example, but non-limitingly: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

Preferably, the tank for which the process according to the invention is intended has a multilayer structure comprising at least one thermoplastic layer and at least one additional layer which, advantageously, may be formed from a material that is a barrier to liquids and/or gases.

Preferably, the nature and the thickness of the barrier layer are chosen so as to minimize the permeability of the liquids and gases in contact with the wall of the tank. Preferably, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The term "parison" is understood to mean a preform of a single part, generally extruded and generally of substantially tubular shape, which is intended to form the wall of the tank after moulding, i.e. after an operation which consists in forming the parison, which is in the melt state, into the required shapes and dimensions using the mould in order to obtain a tank.

The process according to the invention preferably uses an extruded parison. This parison may be derived from an extruder with a storage head, in which case the process generally uses a mould that is fixed open at the start of each cycle in order to receive a parison. Alternatively, the process may resort to continuous extrusion, either with a moving mould that is periodically closed up over this parison, or with a manipulation of the parison towards the mould.

According to the invention, the parison and the accessory are placed in a mould, the accessory being surrounded by the (preferably stretched) parison. Generally, this takes place either by inserting the accessory into the parison that is held apart by an appropriate device, or by extruding the parison around the accessory while separating it with a device that follows its movement on exiting the extruder. The latter variant is preferred, most particularly in combination with an extruder with a storage head.

Whichever variant is used, the process according to the invention therefore preferably uses a tool that makes it possible to stretch the parison (keep it open). This tool may consist of clamps or jaws capable of gripping the edges of the parison and keeping them apart. Preferably, this tool is operated by a robot.

The process according to the invention also uses a mould that comprises cavities, i.e. sorts of hollow half-shells, the perimeters of which are identical and the internal surface of which is equipped with a relief that corresponds to the external shape of the tank, the tank being moulded by pressing the parison against this surface using a pressurized gas injected into the parison, generally by means of a blow pin.

According to the invention, the mould cavities comprise at least one moving part capable of locally pressing the parison against the accessory in order to attach the latter thereto. This attachment may be carried out by welding, mechanical anchoring, snap riveting, etc. Preferably, when the materials of the accessory and of the parison are compatible (at least at the surface), this attachment takes place by welding.

Generally, when the mould is open (i.e. when its cavities are separated), the moving part projects into the mould. When it is closed, the moving part pushes the parison and comes into contact with the component; it then remains in place so that it is retracted inside the mould in order that its end can conform to (form the continuation of) the internal surface of the cavity on which it is found when the mould is closed.

This moving part is preferably a type of rod for which the movement and the pressure that it exerts on the parison at the location of its attachment to the accessory are controllable.

Preferably, there are several moving parts distributed so as to attach the accessory to the tank in a balanced manner (i.e. to ensure that stress concentrations during operation are avoided).

In the process according to the invention, in particular when the attachment of the accessory takes place by welding, the accessory is preferably preheated prior to its placement in the parison, said preheating taking place preferably at least in the zones intended for its attachment to the parison.

In the process according to the invention, the accessory is preferably loaded onto a support prior to its placement in the parison. Generally, this loading is automated (carried out by a robot or a carousel-type device). This support may be a blow pin which may be used to introduce the pressurized gas (preferably air) into the parison at least during the pre-blow-moulding step b). Preferably, the support for the baffle does not carry out another role so that it can be withdrawn before closure of the mould for the final blow moulding of the tank.

During step b), the parison is simply pre-blow moulded/inflated, preferably without contacting the mould cavities. The pre-blow moulding of the parison simple consists therefore of an expansion of said parison so that its "active" part (that clamped between the mould cavities and intended to form the tank after blow moulding) acquires substantially the same size (internal volume) as the tank, the final blow-moulding step (d) mainly serving to give it its final relief/shape. In general, at the end of step b), the internal volume of the working part of the parison is at least equal to 70%, preferably at least 80%, or even 90%, of the internal volume of the tank.

During this step, the mould is not closed and the lower and upper ends of the parison are preferably sealed in a leaktight manner, but without being closed (i.e. without having their edges welded but, on the other hand, kept apart), by suitable devices located respectively underneath and on top of the mould. These sealing devices may consist of an inner block and two outer moving parts that clamp the parison to the block. This type of device gives good results, in particular for the lower device. As regards the upper device, this may be formed by the extrusion head, i.e. in this variant, which is moreover advantageous, the parison is not yet cut at the time of the pre-blow moulding but is still connected to the extrusion head. This variant makes it possible to do without the pre-blow moulding pin: this is because it is sufficient to equip the extrusion head with a blow-moulding device.

In this variant, the support for the accessory may therefore be withdrawn after step c) and before step d) (final closure of the mould and pressing of the pre-blow-moulded parison against its cavities to give it its final shape). In this variant, to carry out the blow moulding in step d), it is possible to use at least one (preferably two) needle(s) that pierce(s) the parison during the closure of the mould, preferably in a zone that will subsequently be machined (for example, at the openings for pump/gauge module(s)).

Alternatively, in another variant, during step d), the mould cavities are pressed against one another and clamp the parison between their perimeters (which delimits a parting line around the perimeter of the tank) and around the blow pin which acts as a support for the accessory during steps a) to d) while being withdrawn before step e). Generally, the blow pin is inserted into the mould via the underside.

In this variant, the mould is therefore gradually closed between steps b) and d), the rods projecting inside the mould that attach the accessory in step c) then remaining immobile and preferably applying a constant pressure to the attachment point(s) and being gradually withdrawn inside the mould in order to conform to the internal surface of the cavities in step d).

In this variant, the pin therefore leaves an opening in the tank at the parting line (part clamped by the perimeters of the cavities). This opening may be resealed before demoulding of the tank, and preferably immediately after removal of the pin, by dint of an appropriate device (sorts of jaws) in the mould.

In the process according to the invention, before the demoulding step e), the moulded parison is preferably left to cool—generally by circulating a cooling gas through one or more blow-moulding needles. The mould cavities are then preferably also cooled by circulation of a fluid in a network of ducts.

At the end of the demoulding step and before the following moulding cycle, it may prove necessary to clean (deflash) the intermediate parison-sealing devices which generally comprise parison "flash" or waste that overflows from the mould when the latter is closed.

The process according to the invention is suitable for attaching any accessory to the inside of a fuel tank. It is however particularly well suited to attaching noise reduction baffles.

Preferably, these baffles have a suitable geometry in order to be able to occupy a maximum of space in the tank once the latter is moulded. In other words: they preferably have a variable geometry and occupy a smaller volume before blow moulding of the parison than when the tank is in operation.

Most particularly preferably, the variable geometry is obtained via the choice of a baffle:
that comprises sliding parts, the deployment of which is carried out during a subsequent finishing operation; or
that comprises two separate parts which are placed side by side until the end of the pre-blow-moulding step b) and separated just before step c); or
that has a foldable structure and that is in a folded-up form in the parison before blow moulding of the latter.

Thus, in a first variant, the baffle comprises sliding parts (type of "drawers"), the deployment of which is carried out during a subsequent finishing operation, which is either manual or automated, through one/some opening(s) in the tank.

In a second variant which requires the presence of at least one moving part in each cavity, the baffle comprises two separate parts, each borne by a holding pin. When the baffles are introduced into the parison (or when the parison is extruded around the baffle) these parts are placed side by side. The operation for separating the baffles takes place at the end of the pre-blow-moulding step b) and just before the attachment of the parts of the baffle to the parison via the moving parts of the cavities (step c)). These pins are preferably firmly attached to the lower sealing device of the parison.

And in a $3^{rd}$ variant, the baffle has a foldable structure (for example of accordion type) and it is in a folded-up form in the parison before blow moulding of the latter. Preferably, this structure is deployed by compression on at least 2 of its points, which preferably correspond to the points for attachment of the baffle to the parison, using moving parts. This compression (and the resulting deployment) may be carried out during the step of attaching the baffle to the parison (step c)) and/or during the closure of the mould to carry out the final blow moulding (step d)). In this variant, the foldable structure may be such that during its deployment, new points for attachment of the accessory to the parison are created.

The objective of FIGS. 1 to 10 is to illustrate certain concrete aspects of the invention, without wishing to restrict the scope thereof in any way.

Figure 5:
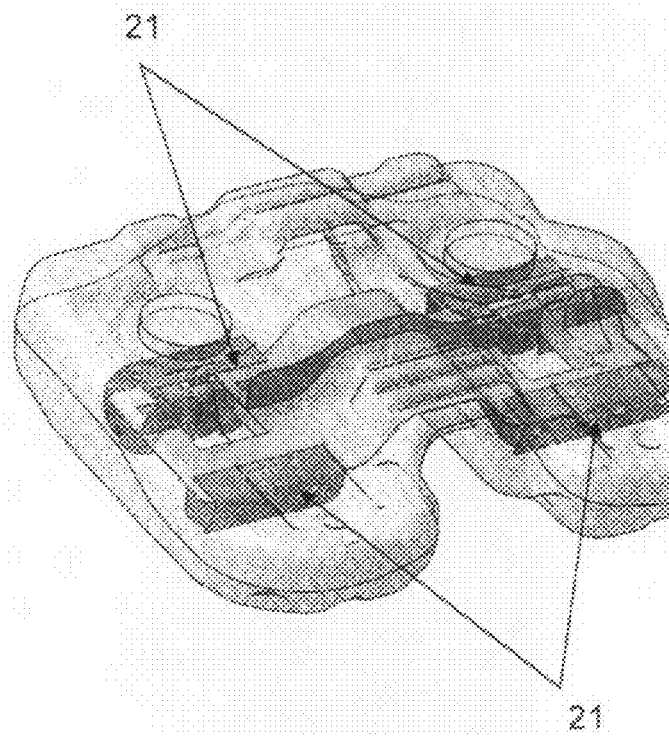
FIG. 5 is a schematic diagram illustrating a process according to an embodiment of the present application.
Figure 6:
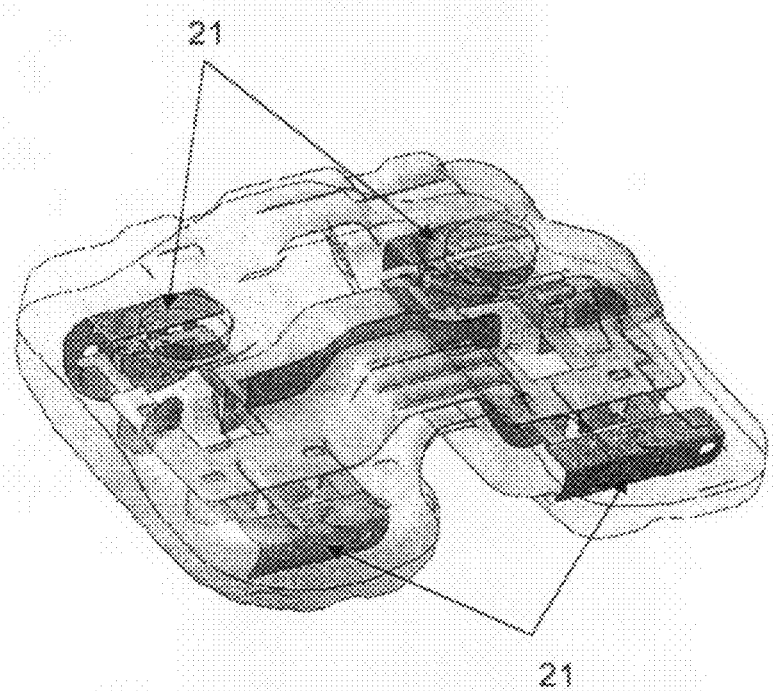
FIG. 6 is a schematic diagram illustrating a process according to an embodiment of the present application.
Figure 7:
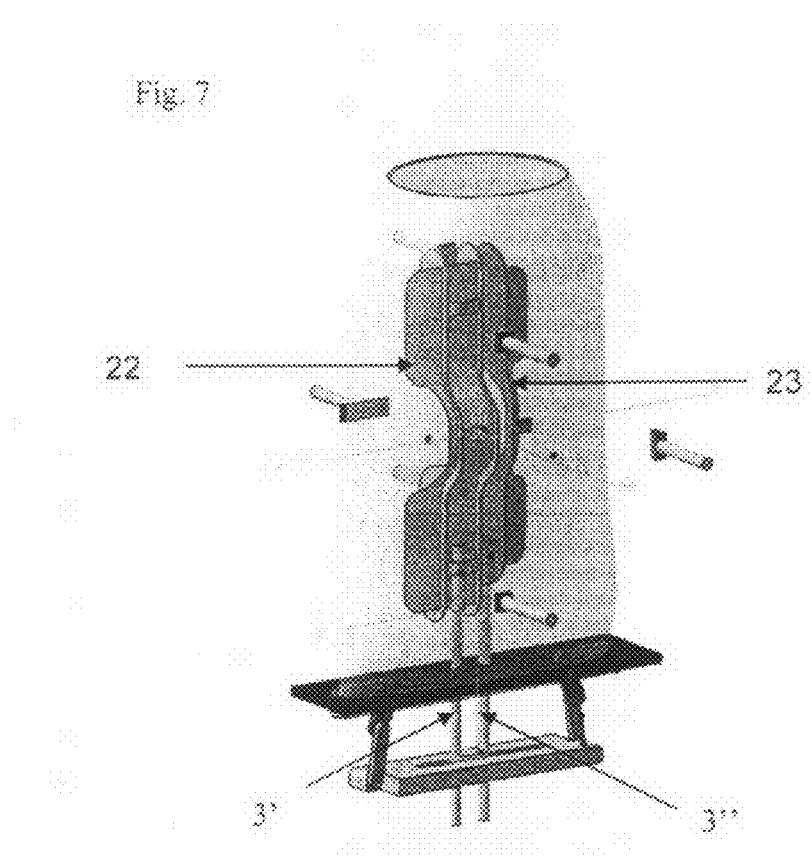
FIG. 7 is a schematic diagram illustrating a process according to an embodiment of the present application.
Figure 8:
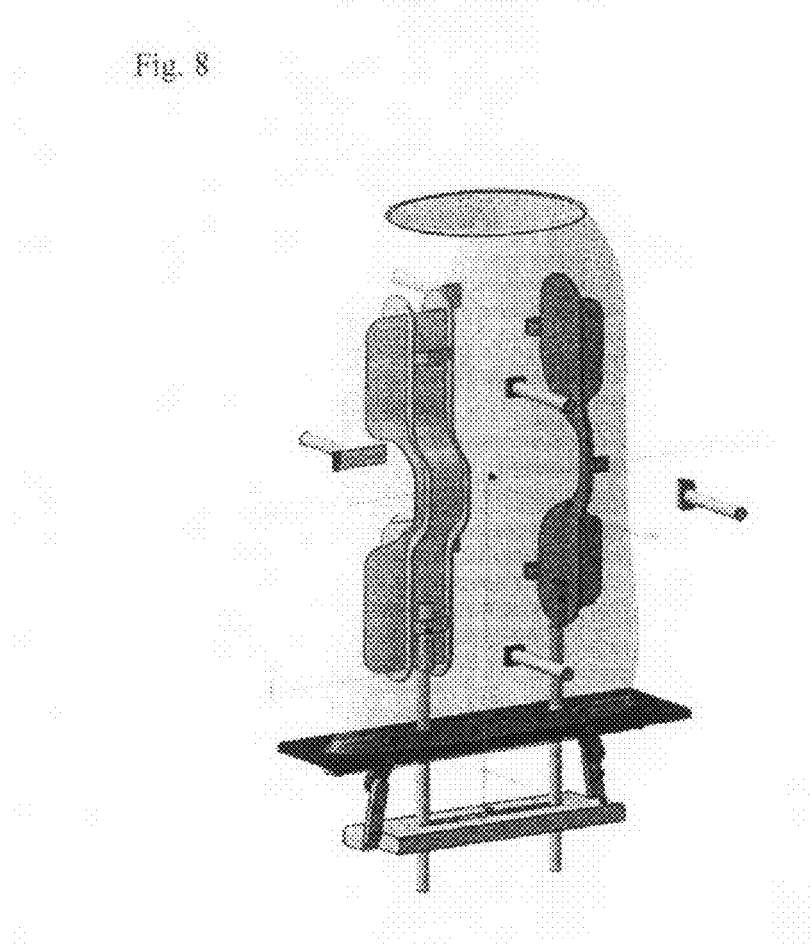
FIG. 8 is a schematic diagram illustrating a process according to an embodiment of the present application.
Figure 9:
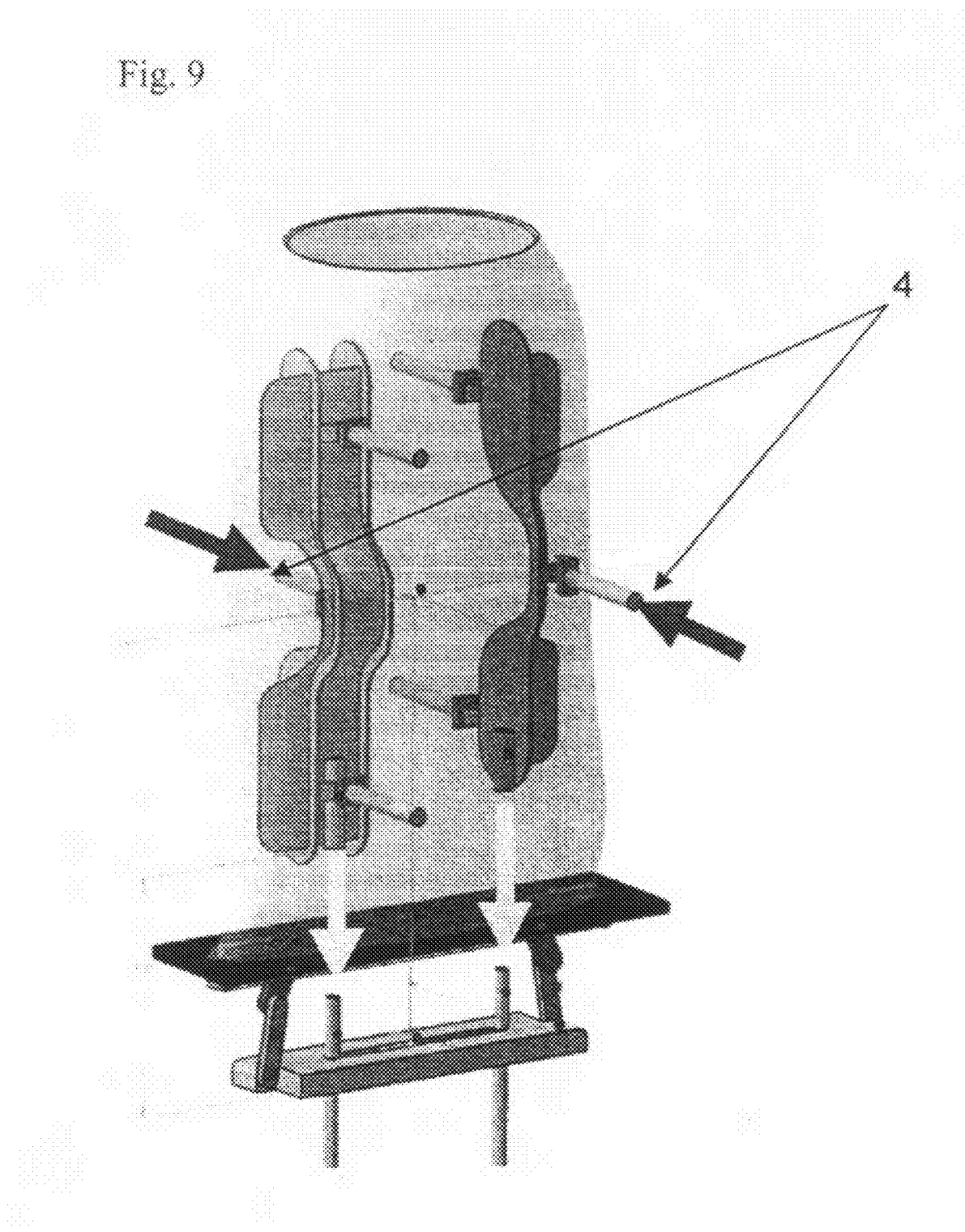
FIG. 9 is a schematic diagram illustrating a process according to an embodiment of the present application.
Figure 10:
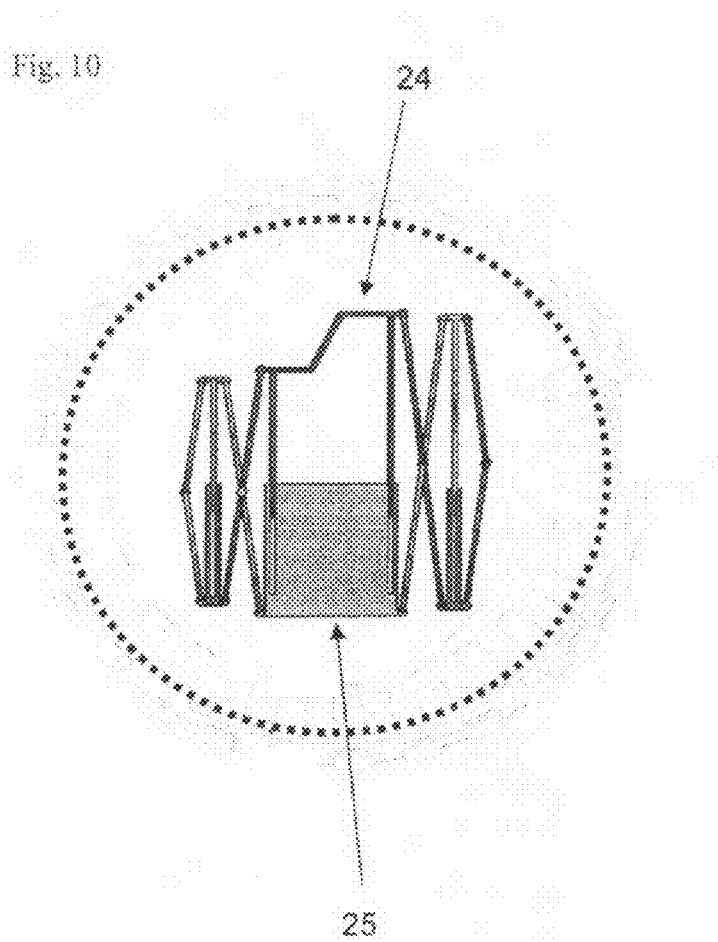
FIG. 10 is a schematic diagram illustrating a process according to an embodiment of the present application.
Figure 11:
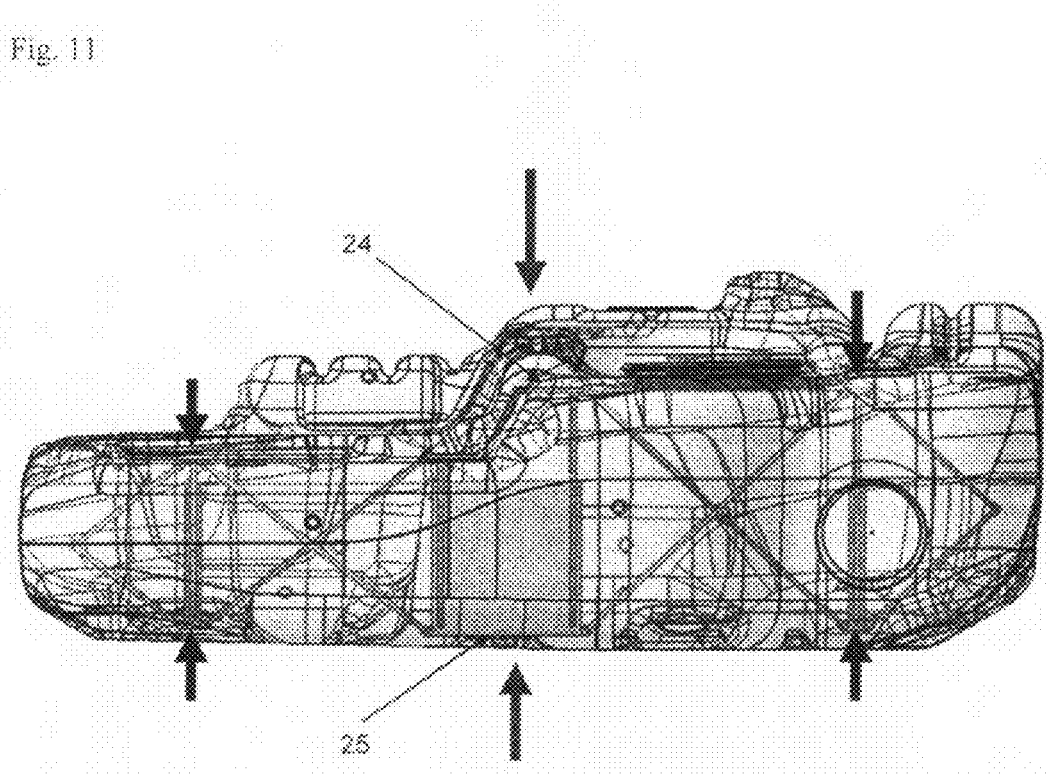
FIG. 11 is a schematic diagram illustrating a process according to an embodiment of the present application.

The objective of FIGS. 1 to 4 is to illustrate the principle of a process according to a variant of the invention;

FIGS. 5 and 6 illustrate a $1^{st}$ subvariant of this process variant;

FIGS. 7 to 9, a $2^{nd}$ subvariant; and finally,

FIGS. 10 and 11, a $3^{rd}$ subvariant.

These figures illustrate common components, namely:

1: a mould comprising two cavities;
2: a noise reduction baffle;
3: a support for the baffle;
4: parts that move in the cavities;
5: a parison;
6: a device for separating and guiding the parison; and 7 & 7': a lower sealing device of the parison comprising an inner block (7) and two outer moving parts (7').

Figure 2:
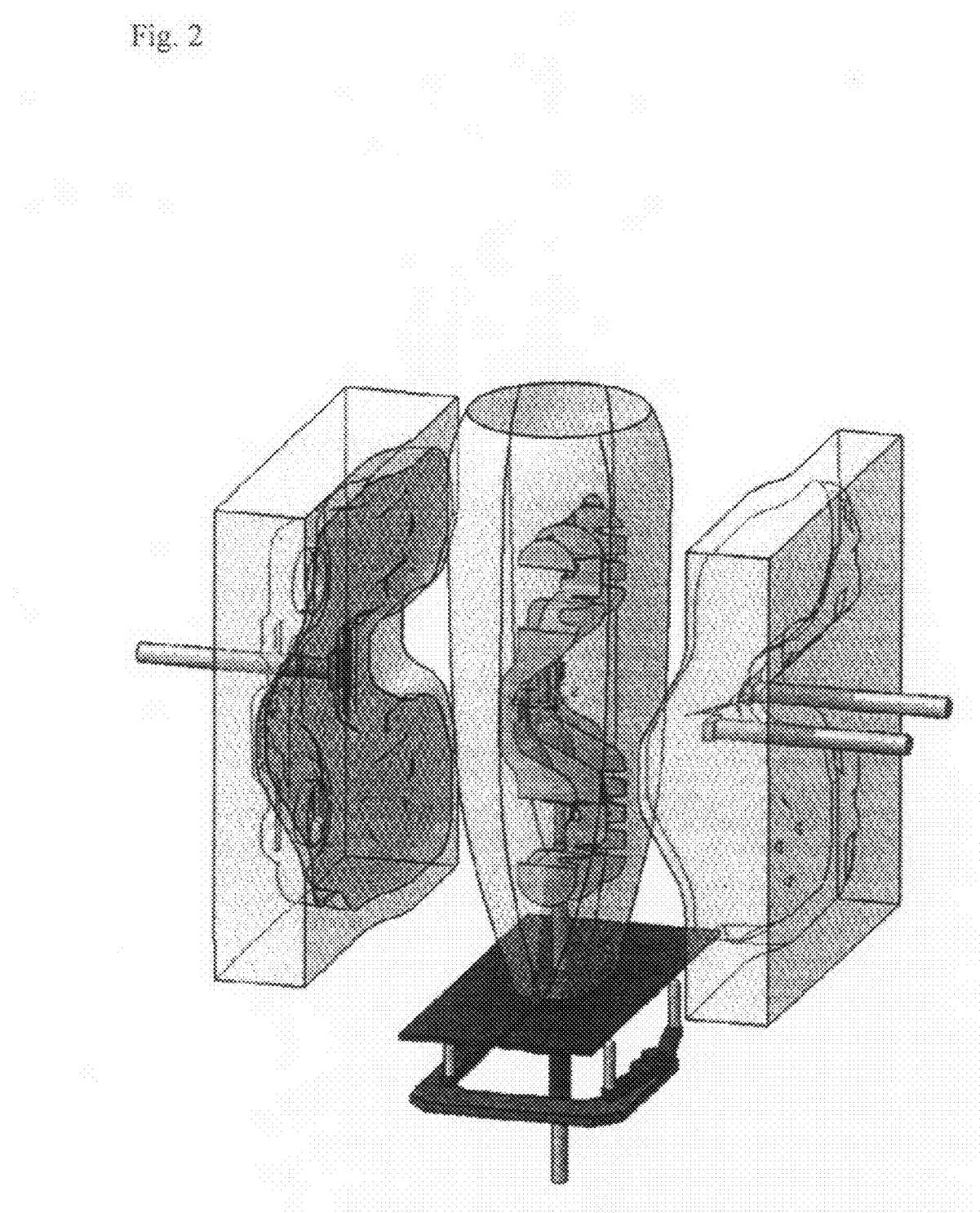
FIG. 2 is a schematic diagram illustrating a process according to an embodiment of the present application.

In FIG. 1, it can be seen how the device (6) guides the parison (5) in order to introduce it around the baffle (2) while keeping it open/apart. The baffle (2) has been previously loaded onto a support (3). This device is operated by a robot and stops underneath the sealing device (7, 7') as illustrated in FIG. 2. The mould cavities have an internal surface (1') that corresponds to the external surface of the tank to be moulded.

In FIG. 2, it can be seen how the inner block (7) makes it possible to separate the parison and to avoid contact between the baffle and the parison, and how the outer parts (7') clamp the parison (5) to this block (7) so as to carry out a pre-blow moulding in a leaktight manner using the extrusion head (not represented), to which the parison is still attached.

Figure 3:
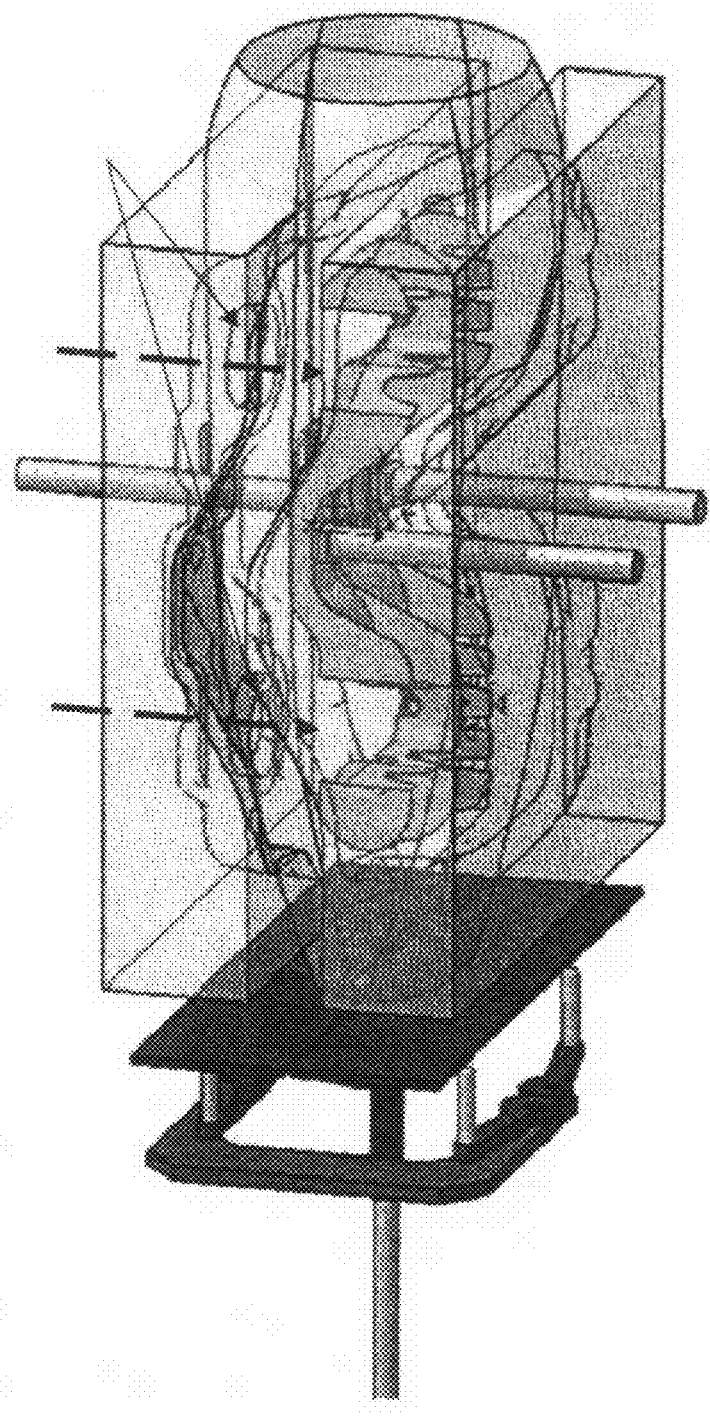
FIG. 3 is a schematic diagram illustrating a process according to an embodiment of the present application.

In FIG. 3, the mould (1) can be seen in an intermediate closure position which is such that the moving parts (4) have locally pushed the parison to bring it into contact locally with the baffle (2). Once the points of contact (welding in this variant) are produced, the baffle support (3) may be withdrawn (it is moreover no longer represented in this figure) and it is possible to close the mould (1) for the final moulding of the tank. During the closure, the moving parts (4) retract inside the mould (although they are immobile in absolute terms and keep the welding spots under pressure) and become flush with the surface of the cavities (1).

The blow-moulding needles (represented as dotted lines) then pierce the parison to carry out the blow-moulding operation.

Figure 4:
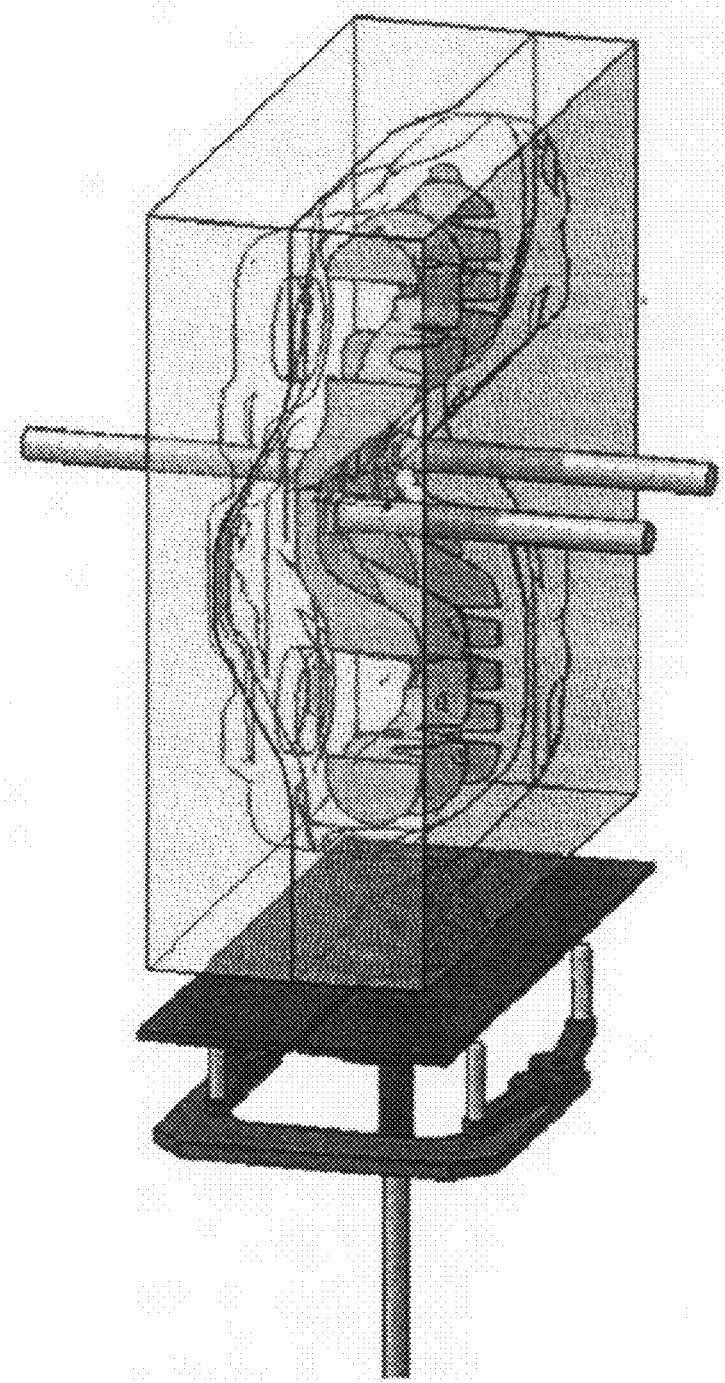
FIG. 4 is a schematic diagram illustrating a process according to an embodiment of the present application.

The mould is shown closed in FIG. 4, where it can be seen that the mould cavities are placed side by side over their perimeter. When the assembly has been cooled, the tank may be demoulded.

The baffle illustrated in FIGS. 1 to 4 is a "conventional", voluminous and incompressible baffle.

The use of a baffle that has large dimensions when in service may be facilitated (reduction in the risk of contact between the parison and the baffle before blow moulding) when the baffle is compressible (i.e. has larger dimensions when in service, in the tank, than when it is inserted into the parison). This is illustrated by 3 subvariants in FIGS. 5 to 10.

In a 1$^{st}$ subvariant that is the subject of FIGS. 5 and 6, the baffle (2) comprises drawers (21) which are closed throughout the manufacture of the tank (FIG. 3), and which are opened (manually or automatically; cf. FIG. 4) during a subsequent finishing step and this being carried out through one or more orifices. These may be openings for pump/gauge module(s) which are cut out on the finishing line and the location of which is indicated in FIG. 3 by two solid arrows.

In a 2$^{nd}$ subvariant that is the subject of FIGS. 7 to 9, the baffle (2) is in fact composed of two separate parts (22, 23) which are each supported by independent supports (3', 3") which are positioned side by side until the pre-blow moulding of the parison (see FIG. 7) and which are separated (see FIG. 8) before attachment of the baffles (22, 23) by the moving parts (4) (see FIG. 9 where horizontal arrows show the movement of these parts and vertical arrows show the withdrawal movement of the supports).

In a 3$^{rd}$ subvariant that is the subject of FIGS. 10 and 11, the baffle (2) is composed of a foldable structure, a radial view (through a plane perpendicular to the axis of the parison) of which is illustrated in FIG. 10.

This structure comprises two end zones (24, 25) which act as points of compression for the moving parts (4) of the mould during step c) or even during the subsequent closure of the mould. This is illustrated by the central arrows in FIG. 11, which represents an axial cross section of the moulded tank with its walls "ghosted out". The closure of the mould (not represented) creates additional attachment points (illustrated by the side arrows in FIG. 11).

In order to avoid shell damage during burst/drop test (and of course, in real life, in the case of crash), it is prefeable to provide at least one weak point (notch) around the weld zones (i.e. the points where the baffle and the tank are joined by the moving part inside the mould). According to a preferred embodiment, the weld zones are equipped with weld feet and there is a break zone (weak point) provided between said weld feet and the body of the accessory so that in the case of drop/crash, the accessory can eventually be detached from the tank without damaging it. Such a feature is for instance disclosed in patent application US 2003/0201021, the content of which is incorporated by reference into the present application.

Also, since the accessory is generally cold when it is attached to the molten parison and since said parison generally retracts afterwards during cooling, it is preferable to provide the accessory with an appropriate design so that said retraction does not damage the tank and/or break the above mentioned break zones (weak points). Providing parts in the accessory with an appropriate thickness and shape so that they are flexible and can easily be deformed, gives good results.

FIG. 12 illustrates the above mentioned features, namely: weld feet (26), a notch zone (27) and parts with improved flexibility (28).

The invention claimed is:

1. A process for manufacturing a fuel tank equipped with an internal accessory and having a plastic wall produced from a parison, said process comprising, in order, the following steps:
   a) the accessory and the molten parison are introduced into a mould so that the accessory is surrounded by the parison, said mould comprising cavities equipped with at least one moving part;
   b) a pressurized gas is introduced inside the parison to carry out a pre-blow moulding of said parison;
   c) the pre-blow-moulded parison is pressed by the moving part against the accessory in order to firmly attach the accessory and parison without piercing the parison;
   d) the mould is closed and the final blow moulding of the parison is carried out by flattening it against the mould cavities using the pressurized gas; and
   e) the tank is removed from the mould; wherein when the mold is open, the moving part projects into the mold and when the mold is closed, the moving part does not move so that it is retracted inside the mold in order that its end is able to conform to the internal surface of the cavity on which it is found when the mold is closed.

2. The process according to claim 1, wherein the parison is extruded around the accessory while being guided and kept open using a device that follows its movement on exiting the extruder.

3. The process according to claim 2, wherein the extruder comprises a storage head.

4. The process according to claim 1, wherein during the pre-blow-moulding step b) the lower and upper ends of the parison are sealed in a leaktight manner, but without being welded, by suitable devices located respectively underneath and on top of the mould.

5. The process according to claim 1, wherein during step d) the mould cavities are pressed against one another and clamp the parison around a blow pin which acts as a support for the accessory during steps a) to d) while being withdrawn at the end of step d), and wherein, when the pin is withdrawn, it leaves an opening in the parison which is resealed before step e) by an appropriate device on the mould.

6. The process according to claim 1, wherein the accessory is held in the parison by a support which is withdrawn after step c) and before step d).

7. The process according to claim 1, wherein the accessory is a noise reduction baffle.

8. The process according to claim 7, wherein the baffle has a variable geometry and occupies a smaller volume before blow moulding of the parison than when the tank is in operation.

9. The process according to claim 8, wherein the variable geometry is obtained via the choice of a baffle:
   that comprises sliding parts, the deployment of which is carried out during a subsequent finishing operation; or
   that comprises two separate parts which are placed side by side until the end of the pre-blow-moulding step b) and separated just before step c); or
   that has a foldable structure and that is in a folded-up form in the parison before blow moulding of the latter.

* * * * *

(12) EX PARTE REEXAMINATION CERTIFICATE (10265th)
United States Patent
Roos et al.

(10) Number: US 8,282,875 C1
(45) Certificate Issued: Aug. 20, 2014

(54) PROCESS FOR MANUFACTURING A FUEL TANK EQUIPPED WITH AN INTERNAL ACCESSORY

(75) Inventors: Sylvain Roos, Gyeongju (KR); Manuel Bretnacher, Gyeongju (KR)

(73) Assignee: Inergy Automotive Systems Research (Societe Anonyme), Brussels (BE)

Reexamination Request:
No. 90/013,091, Dec. 9, 2013

Reexamination Certificate for:
Patent No.: 8,282,875
Issued: Oct. 9, 2012
Appl. No.: 12/597,374
Filed: Oct. 23, 2009

(21) Appl. No.: 90/013,091

(22) PCT Filed: May 8, 2008

(86) PCT No.: PCT/EP2008/055715
§ 371 (c)(1),
(2), (4) Date: Oct. 23, 2009

(87) PCT Pub. No.: WO2008/138869
PCT Pub. Date: Nov. 20, 2008

(30) Foreign Application Priority Data

May 10, 2007 (FR) .................................. 07 54962

(51) Int. Cl.
*B29C 49/22* (2006.01)
*B29C 49/16* (2006.01)
*B29C 35/16* (2006.01)
*B29C 49/20* (2006.01)
*B29C 49/42* (2006.01)

(52) U.S. Cl.
CPC ................. *B29C 49/20* (2013.01); *B29C 49/22* (2013.01); *B29C 49/16* (2013.01); *B29C 35/16* (2013.01); *B29C 49/4247* (2013.01)
USPC ........... 264/516; 264/259; 264/511; 264/529; 264/531

(58) Field of Classification Search
None
See application file for complete search history.

(56) References Cited

To view the complete listing of prior art documents cited during the proceeding for Reexamination Control Number 90/013,091, please refer to the USPTO's public Patent Application Information Retrieval (PAIR) system under the Display References tab.

*Primary Examiner* — Terrence Till

(57) ABSTRACT

Process for manufacturing a fuel tank equipped with an internal accessory and having a plastic wall produced from a parison, said process comprising, in order, the following steps:
a) the accessory and the molten parison are introduced into a mould so that the accessory is surrounded by the parison, said mould comprising cavities equipped with at least one moving part;
b) a pressurized gas is introduced inside the parison to carry out a pre-blow moulding of said parison;
c) the pre-blow-moulded parison is pressed locally against the accessory using the moving part in order to firmly attach the two without piercing the parison;
d) the mould is closed and the final blow moulding of the parison is carried out by flattening it against the mould cavities using the pressurized gas; and
e) the tank is removed from the mould.

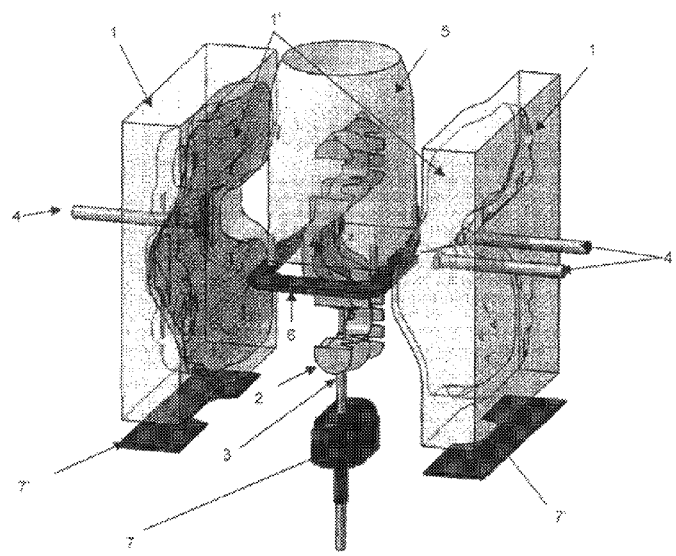

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

New claims 10-38 are added and determined to be patentable.

1. A process for manufacturing a fuel tank equipped with an internal accessory and having a plastic wall produced from a parison, said process comprising, in order, the following steps:
   a) the accessory and the molten parison are introduced into a mould so that the accessory is surrounded by the parison, said mould comprising cavities equipped with at least one moving part;
   b) a pressurized gas is introduced inside the parison to carry out a pre-blow moulding of said parison;
   c) the pre-blow-moulded parison is pressed by the moving part against the accessory in order to firmly attach the accessory and parison without piercing the parison;
   d) the mould is closed and the final blow moulding of the parison is carried out by flattening it against the mould cavities using the pressurized gas; and
   e) the tank is removed from the mould; wherein when the [mold] *mould* is open, the moving part projects into the [mold] *mould* and when the [mold] *mould* is closed, the moving part does not move so that it is retracted inside the [mold] *mould* in order that its end is able to conform to the internal surface of the cavity on which it is found when the [mold] *mould* is closed.

10. *The process according to claim 1, wherein, at the end of step b), the internal volume of the working part of the parison is at least 70% of the internal volume of the tank.*

11. *The process according to claim 1, wherein, at the end of step b), the internal volume of the working part of the parison is at least 80% of the internal volume of the tank.*

12. *The process according to claim 1, wherein, at the end of step b), the internal volume of the working part of the parison is at least 90% of the internal volume of the tank.*

13. *A process for manufacturing a fuel tank equipped with an internal accessory and having a plastic wall produced from a parison, said process comprising, in order, the following steps:*
   *a) the accessory and the molten parison are introduced into a mould so that the accessory is surrounded by the parison, said mould comprising cavities equipped with at least one moving part;*
   *b) sealing the lower end of the parison in a leaktight manner and then introducing a pressurized gas inside the parison to carry out a pre-blow moulding of said parison;*
   *c) the pre-blow-moulded parison is pressed by the moving part against the accessory in order to firmly attach the accessory and parison without piercing the parison;*
   *d) the mould is closed and the final blow moulding of the parison is carried out by flattening it against the mould cavities using the pressurized gas; and*
   *e) the tank is removed from the mould; wherein when the mould is open, the moving part projects into the mould and when the mould is closed, the moving part does not move so that it is retracted inside the mould in order that its end is able to conform to the internal surface of the cavity on which it is found when the mould is closed.*

14. *The process according to claim 13, wherein the parison is extruded around the accessory while being guided and kept open using a device that follows its movement on exiting the extruder.*

15. *The process according to claim 14, wherein the extruder comprises a storage head.*

16. *The process according to claim 13, wherein the lower end of the parison is sealed in a leaktight manner, without being welded, by suitable devices located respectively underneath and on top of the mould.*

17. *The process according to claim 13, wherein during the pre-blow-moulding step b) the lower and upper ends of the parison are sealed in a leaktight manner, but without being welded, by suitable devices located respectively underneath and on top of the mould.*

18. *The process according to claim 13, wherein during step d) the mould cavities are pressed against one another and clamp the parison around a blow pin which acts as a support for the accessory during steps a) to d) while being withdrawn at the end of step d), and wherein, when the pin is withdrawn, it leaves an opening in the parison which is resealed before step e) by an appropriate device on the mould.*

19. *The process according to claim 13, wherein the accessory is held in the parison by a support which is withdrawn after step c) and before step d).*

20. *The process according to claim 13, wherein the accessory is a noise reduction baffle.*

21. *The process according to claim 20, wherein the baffle has a variable geometry and occupies a smaller volume before blow moulding of the parison than when the tank is in operation.*

22. *The process according to claim 21, wherein the variable geometry is obtained via the choice of a baffle:*
   *that comprises sliding parts, the deployment of which is carried out during a subsequent finishing operation; or*
   *that comprises two separate parts which are placed side by side until the end of the pre-blow-moulding step b) and separated just before step c); or*
   *that has a foldable structure and that is in a folded-up form in the parison before blow moulding of the latter.*

23. *The process according to claim 13, wherein, at the end of step b), the internal volume of the working part of the parison is at least 70% of the internal volume of the tank.*

24. *The process according to claim 13, wherein, at the end of step b), the internal volume of the working part of the parison is at least 80% of the internal volume of the tank.*

25. *The process according to claim 13, wherein, at the end of step b), the internal volume of the working part of the parison is at least 90% of the internal volume of the tank.*

26. *A process for manufacturing a fuel tank equipped with an internal accessory and having a plastic wall produced from a parison, said process comprising, in order, the following steps:* a) the accessory and the molten parison are introduced into a mould so that the accessory is surrounded by the parison, said mould comprising cavities equipped with at least one moving part;

b) sealing the lower end of the parison in a leaktight manner by a device located underneath the mould which comprises an inner block and two other moving parts that clamp the parison to the block and then introducing a pressurized gas inside the parison to carry out a pre-blow moulding of said parison;

c) the pre-blow-moulded parison is pressed by the moving part against the accessory in order to firmly attach the accessory and parison without piercing the parison;

d) the mould is closed and the final blow moulding of the parison is carried out by flattening it against the mould cavities using the pressurized gas; and e) the tank is removed from the mould; wherein when the mould is open, the moving part projects into the mould and when the mould is closed, the moving part does not move so that it is retracted inside the mould in order that its end is able to conform to the internal surface of the cavity on which it is found when the mould is closed.

27. The process according to claim 26, wherein the parison is extruded around the accessory while being guided and kept open using a device that follows its movement on exiting the extruder.

28. The process according to claim 27, wherein the extruder comprises a storage head.

29. The process according to claim 26, wherein the lower end of the parison is sealed in a leaktight manner, without being welded, by suitable devices located respectively underneath and on top of the mould.

30. The process according to claim 26, wherein during the pre-blow-moulding step b) the lower and upper ends of the parison are sealed in a leaktight manner, but without being welded, by suitable devices located respectively underneath and on top of the mould.

31. The process according to claim 26, wherein during step d) the mould cavities are pressed against one another and clamp the parison around a blow pin which acts as a support for the accessory during steps a) to d) while being withdrawn at the end of step d), and wherein, when the pin is withdrawn, it leaves an opening in the parison which is resealed before step e) by an appropriate device on the mould.

32. The process according to claim 26, wherein the accessory is held in the parison by a support which is withdrawn after step c) and before step d).

33. The process according to claim 26, wherein the accessory is a noise reduction baffle.

34. The process according to claim 33, wherein the baffle has a variable geometry and occupies a smaller volume before blow moulding of the parison than when the tank is in operation.

35. The process according to claim 34, wherein the variable geometry is obtained via the choice of a baffle:
  that comprises sliding parts, the deployment of which is carried out during a subsequent finishing operation; or
  that comprises two separate parts which are placed side by side until the end of the pre-blow-moulding step b) and separated just before step c); or
  that has a foldable structure and that is in a folded-up form in the parison before blow moulding of the latter.

36. The process according to claim 26, wherein, at the end of step b), the internal volume of the working part of the parison is at least 70% of the internal volume of the tank.

37. The process according to claim 26, wherein, at the end of step b), the internal volume of the working part of the parison is at least 80% of the internal volume of the tank.

38. The process according to claim 26, wherein, at the end of step b), the internal volume of the working part of the parison is at least 90% of the internal volume of the tank.

\* \* \* \* \*